United States Patent
Gousset et al.

(10) Patent No.: US 12,103,704 B2
(45) Date of Patent: Oct. 1, 2024

(54) AIRCRAFT PROVIDED WITH A WIDE APERTURE LIGHT SIGNALING SYSTEM

(71) Applicant: Safran Electronics & Defense, Paris (FR)

(72) Inventors: Simon Gousset, Moissy-cramayel (FR); Guillaume Bourdin, Moissy-cramayel (FR)

(73) Assignee: Safran Electronics & Defense, Paris (FR)

( * ) Notice: Subject to any disclaimer, the term of this patent is extended or adjusted under 35 U.S.C. 154(b) by 0 days.

(21) Appl. No.: 18/266,954

(22) PCT Filed: Dec. 10, 2021

(86) PCT No.: PCT/FR2021/052280
§ 371 (c)(1),
(2) Date: Jun. 13, 2023

(87) PCT Pub. No.: WO2022/129748
PCT Pub. Date: Jun. 23, 2022

(65) Prior Publication Data
US 2024/0010354 A1    Jan. 11, 2024

(30) Foreign Application Priority Data
Dec. 16, 2020   (FR) ...................... 2013348

(51) Int. Cl.
*B64D 47/06*    (2006.01)
*F21V 15/00*    (2015.01)
(Continued)

(52) U.S. Cl.
CPC .............. *B64D 47/06* (2013.01); *F21V 15/00* (2013.01); *F21W 2103/10* (2018.01); *F21W 2107/30* (2018.01)

(58) Field of Classification Search
CPC . B64D 47/06; F21W 2107/30; F21W 2103/10
See application file for complete search history.

(56) References Cited

U.S. PATENT DOCUMENTS

| | | |
|---|---|---|
| 2011/0122635 A1 | 5/2011 | Calvin et al. |
| 2014/0119010 A1 | 5/2014 | Sanada et al. |
| 2016/0280395 A1* | 9/2016 | Jha .................. F21V 17/107 |

FOREIGN PATENT DOCUMENTS

| | | |
|---|---|---|
| EP | 2392511 A2 | 12/2011 |
| EP | 2921410 A1 | 9/2015 |

(Continued)

OTHER PUBLICATIONS

International Patent Application No. PCT/FR2021/052280, International Search Report (and translation) and Written Opinion, dated Apr. 4, 2022.

*Primary Examiner* — Sean P Gramling
(74) *Attorney, Agent, or Firm* — Kilpatrick Townsend & Stockton LLP

(57) ABSTRACT

Disclosed is an aircraft provided with a light signaling system including at least one light-emitting device at the tip of each wing and at least one light-emitting device at the tip of the tail. Each light-emitting device at the wingtip can be arranged in a recess formed in the profile of the wing and include a covering At least one light source and a protective glass can be arranged on the recess so that the outer surface matches the shape of the wing. The inner surface of the protective glass can be provided with at least one local variation in thickness so as to increase the angular aperture of each wingtip light-emitting device in order to ensure the overlap between the light-emitting devices at the wingtip and the light emitted by the light-emitting device on the tail.

3 Claims, 2 Drawing Sheets

(51) Int. Cl.
*F21W 103/10* (2018.01)
*F21W 107/30* (2018.01)

(56) References Cited

FOREIGN PATENT DOCUMENTS

EP 3741684 A1 11/2020
FR 1437645 A 5/1966

* cited by examiner

[Fig. 1]
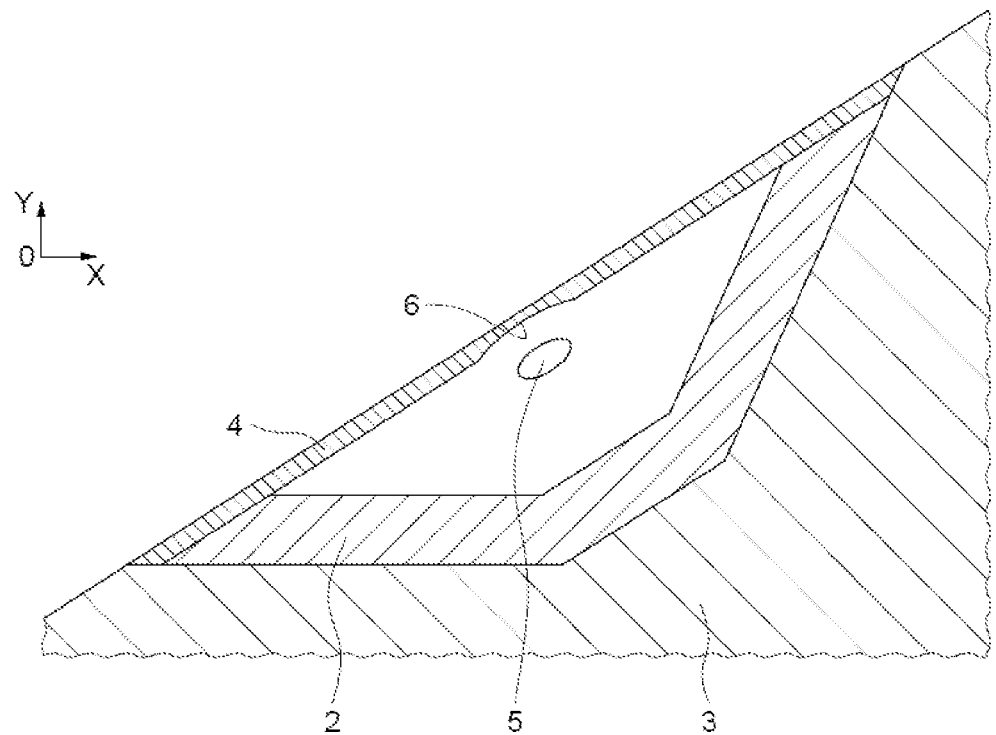
[Fig. 2]
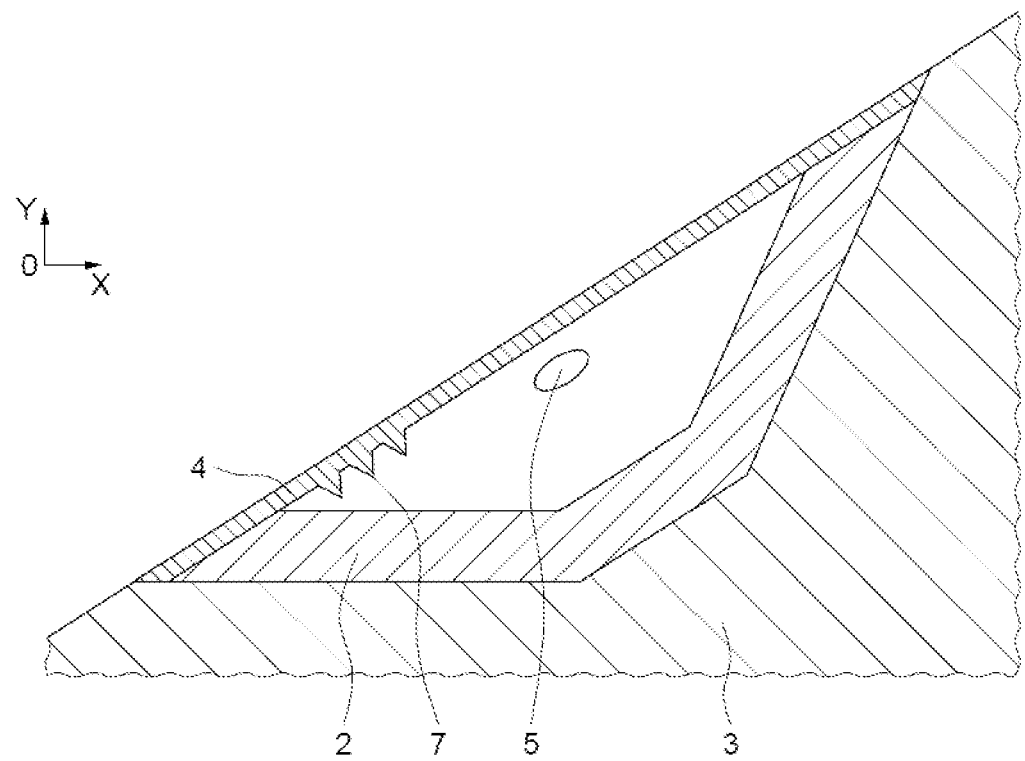

[Fig. 3]
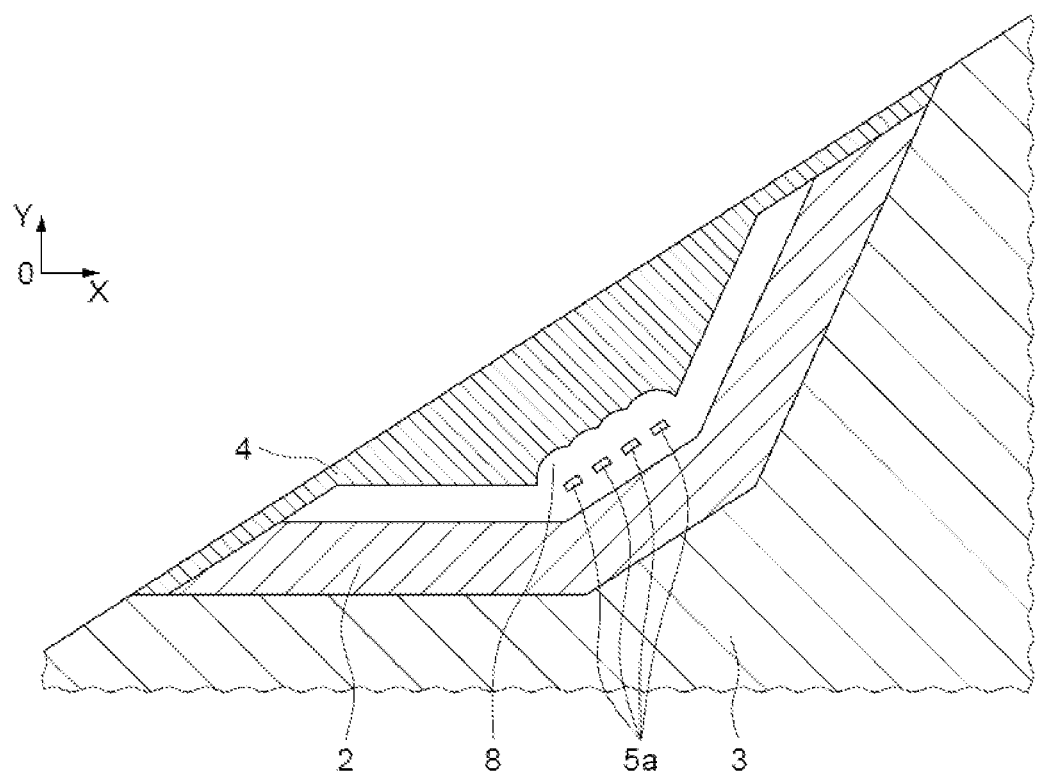

AIRCRAFT PROVIDED WITH A WIDE APERTURE LIGHT SIGNALING SYSTEM

CROSS REFERENCE TO RELATED APPLICATIONS

This application is the United States national phase entry of International Patent Application PCT/FR2021/052280 ("the '280 application"), filed on Dec. 10, 2021, and titled "AIRCRAFT PROVIDED WITH A WIDE APERTURE LIGHT SIGNALLING SYSTEM," which application is related to and claims priority benefits of France Patent Application No. 2013348 ("the '348 application"), filed on Dec. 16, 2020. The '280 and '348 applications are hereby incorporated in their entireties by this reference.

TECHNICAL FIELD

The technical field of the invention is aircraft signalling systems, and in particular such systems intended to avoid the collision of aircraft.

PRIOR ART

An anticollision light system enables an aircraft to be visible in flight or on the runway, whatever the direction in which it is located. In the case of a fixed-wing aircraft, the system generally comprises three light-emitting devices, one on the left wing preferentially emitting towards the left front, and on the right wing preferentially emitting towards the right front, and on the tail preferentially emitting to the rear. The light beams emitted by these devices overlap in order to emit light without discontinuity in all the angular directions in the horizontal plane.

The light-emitting devices located at the wing tip are embedded in the wing profile and protected from the environment by a protective cover made from transparent glass or plastics material, following the shape of the wings.

Embedding in the wing profile is necessary to maintain the aerodynamic properties of the wing but causes an obstruction of part of the light beams emitted, limiting the spread angle of these beams.

The light beams emitted are subject to the Snell-Descartes laws when passing through the protective cover of the light-emitting device. Depending on the material used for producing the protective cover and the angle of incidence of the protective cover with respect to the normal, the rays are transmitted with an incidence such that they are obscured by the embedding in the wing profile or even totally reflected inside the light-emitting device.

It will thus be understood that the geometry of the light-emitting device and of the embedding as well as the nature of the protective cover limits the maximum angle of incidence of the light beams contributing to the angular spread in the horizontal plane of the anticollision light system. In some combinations of these parameters, overlap with the light-emitting device located on the tail of the aircraft is then not ensured.

There is therefore a need for an anticollision light system comprising at least one light-emitting device at the wing tip making it possible to obtain sufficient angular spread in the horizontal plane to ensure overlap with the corresponding angular spread of the light-emitting device disposed on the tail of the aircraft.

DISCLOSURE OF THE INVENTION

The object of the invention is an aircraft provided with a light signalling system comprising at least one light-emitting device at the tip of each wing and at least one light-emitting device at the end of the tail, each light-emitting device at the wing tip being disposed in a hollow provided in the profile of the wing and comprising a lining, at least one light source and a protective cover disposed on the hollow so that the exterior surface follows the shape of the wing.

The interior surface of the protective cover is provided with at least one localised variation in thickness so as to increase the angular spread of each light-emitting device at the wing tip in order to ensure overlap between the light-emitting devices at the wing tip and the light emitted by the light-emitting device on the tail.

The exterior surface of the protective cover may be smooth so as not to modify the aerodynamic properties of the wing.

The localised variation in thickness may be a concavity disposed facing a light source and lying in a plane parallel to the horizontal plane.

The localised variation in thickness may be a line with a concave section aligned with a column of light-emitting devices, and perpendicular to the horizontal plane.

The localised variation in thickness may be a discontinuity in thickness lying in a plane normal to the plane of the wing.

The localised variation in thickness may be a prism.

The localised variation in thickness may be a circular concave cavity facing the at least one light source.

A circular concave cavity can be obtained by the intersection of a torus with the planar interior surface of the protective cover, the torus being centred on the direction normal to the protective cover aligned with the light source.

The protective cover may have a variable thickness so that the interior surface of the protective cover substantially matches the shape of the cavity, in order to minimise the distance between said interior surface and the at least one light source.

BRIEF DESCRIPTION OF THE DRAWINGS

Other aims, features and advantages of the invention will appear upon reading the following description, given solely as a non-limiting example, and made with reference to the appended drawings wherein:

FIG. 1 illustrates a cross-sectional view in the plane of the wings of the aircraft of a light-emitting device of an anticollision light system according to a first embodiment, FIG. 2 illustrates a cross-sectional view in the plane of the wings of the aircraft of a light-emitting device of an anticollision light system according to a second embodiment, and FIG. 3 illustrates a cross-sectional view in the plane of the wings of the aircraft of a light-emitting device of an anticollision light system according to a third embodiment,

DETAILED DESCRIPTION

FIG. 1 shows a first embodiment of a light-emitting device 1 at the tip of a wing for an aircraft. More precisely, FIG. 1 is a cross-sectional view in the plane of the wings of the aircraft of a light-emitting device 1.

The light-emitting device 1 comprises a lining 2 designed so as to be embedded in the profile of the wing 3, delimiting a cavity closed by a protective cover 4. The exterior surface of the protective cover remains smooth.

The cavity comprises a light source 5 disposed so as to emit light towards the outside through the protective cover 4. The light-emitting device 1 comprises means for supplying the light source, not illustrated.

In order to increase the spread in the plane of the wings of the light-emitting device, the protective cover comprises a concave modification 6 of its entry surface in the horizontal plane disposed in front of the light source 5.

When the light-emitting device 1 comprises a plurality of light sources, disposed in particular in a matrix in rows and columns, the concave modification 6 takes the form of a line with a concave section facing each column of light sources. It should be noted that a column of sources is then defined as an alignment of sources along a line perpendicular to the plane of the wing.

A second embodiment of a light-emitting device 1 is illustrated by FIG. 2, in which elements identical to those in FIG. 1 are designated by the same numerical reference.

The light-emitting device 1 comprises a lining 2 designed to be embedded in the profile of the wing 3, delimiting a cavity closed by a protective cover 4. The exterior surface of the protective cover remains smooth.

The cavity comprises a light source 5 disposed so as to emit light towards the outside through the protective cover 4. The light-emitting device 1 comprises means for supplying the light source 5, not illustrated.

The light-emitting device 1 comprises discontinuities 7 of thickness on a part of the protective cover, the remainder of the protective cover remaining smooth. The discontinuities are advantageously disposed on the path of the light rays having the greatest incidence with respect to the normal to the protective cover.

These discontinuities make it possible to locally reduce the angle of incidence of some of the light rays of the beam and to increase the coefficient of transmission. Thus the zones of the light beams that were degraded or obscured by the geometry of the wing are partly restored.

In a particular embodiment, each discontinuity is in the form of a prism.

These discontinuities make it possible to improve the overlap of the light beams emitted by the light-emitting devices at the wing tip and by the light-emitting device disposed in the tail, by increasing the horizontal distribution of the light intensity in the plane of the wings emitted by the light-emitting devices disposed at the wing tip.

A third embodiment of a light-emitting device 1 is illustrated by FIG. 3.

The light-emitting device 1 and the lining 2 adapted to be embedded in the profile of the wing 3, delimiting a cavity closed by a protective cover 4, can be recognised on this figure. The exterior surface of the protective cover remains smooth.

The light-emitting device 1 comprises a plurality of light sources 5a disposed so as to emit light towards the outside through the protective cover 4. The light-emitting device 1 comprises means for supplying the light sources 5a, not illustrated.

The protective cover 4 has a variable thickness so that the interior surface of the protective cover substantially matches the shape of the cavity, in order to minimise the distance between said interior surface and the plurality of light sources 5a.

The exterior surface of the protective cover is also provided with circular concave cavities facing each light source 5a. A circular concave cavity is obtained by the intersection of a torus with the planar interior surface of the protective cover.

This embodiment makes it possible not only to reduce the Fresnel losses for the whole of the light beam by reducing the number of interfaces but also to increase the spread in the plane of the wings beyond which the environment of the optical system obscures the beam.

Such a light-emitting device has the advantage of incorporating an optical function of broadening the beam in the protective cover.

The power is improved because of the reduction in the number of air-material interfaces compared with a light-emitting device comprising a protective cover and an optical means for broadening the beam that are separate.

The width of the beam is also improved since the broadening takes place at the protective cover and is therefore not limited by the embedding in the wing.

In addition to improving the power and the width of the beam, such a design reduces the number of parts to be manufactured while improving the compactness in depth of the signalling system.

The light signalling system has been described in relation to an aeroplane. Nevertheless, it relates to any aircraft provided with wings and a tail, such as in particular a helicopter or a drone.

The invention claimed is:

1. An aircraft provided with a light signalling system comprising:
   at least one light-emitting device at a tip of each wing; and
   at least one light-emitting device at an end of a tail, each light-emitting device at the wing tip being disposed in a hollow provided in a profile of the wing and comprising a lining, at least one light source and a protective cover disposed on the hollow so that an exterior surface is flush with a shape of the wing,
   wherein an interior surface of the protective cover is provided with at least one localised variation in thickness so as to increase an angular spread of each light-emitting device at the wing tip in order to ensure overlap between the light emitted by the light-emitting devices located at the wing tip and
   the light emitted by the light-emitting device located on the tail, the protective cover has a variable thickness so that the interior surface of the protective cover substantially matches the shape of the hollow, in order to minimize a distance between said interior surface and the at least one light source, wherein the hollow has a three-dimensional shape, and the interior surface of the protective cover substantially matches the three-dimensional shape of the hollow.

2. The aircraft according to claim 1, wherein the exterior surface of the protective cover is smooth so as not to modify aerodynamic properties of the wing.

3. The aircraft according to claim 1, wherein a circular concave cavity is obtained by an intersection of a torus with the planar interior surface of the protective cover, the torus being centered on a direction normal to the protective cover aligned with the light source.

* * * * *